United States Patent [19]

McKee

[11] 4,049,204
[45] Sept. 20, 1977

[54] FAN FOR FORAGE HARVESTING SYSTEM
[75] Inventor: Russell C. McKee, Elmira, Canada
[73] Assignee: McKee Bros. Limited, Elmira, Canada
[21] Appl. No.: 726,012
[22] Filed: Sept. 23, 1976
[51] Int. Cl.² .................................................. B02C 23/28
[52] U.S. Cl. ................... 241/55; 241/101 A; 241/292.1
[58] Field of Search .............. 241/50, 51, 55, 101 A, 241/101.5, 101.7, 185 A, 246, 247, 292.1; 302/60; 214/9, 42 R

[56] References Cited
U.S. PATENT DOCUMENTS

| 1,159,822 | 11/1915 | Bartholomew | 241/55 |
| 1,575,853 | 3/1926 | MacGregor | 241/55 |
| 1,608,183 | 11/1926 | Quante | 241/55 |
| 2,809,389 | 10/1957 | Collins et al. | 241/55 |
| 2,861,748 | 11/1958 | Miller | 241/51 |
| 3,883,110 | 5/1975 | Herlop | 302/60 |

Primary Examiner—Granville Y. Custer, Jr.
Attorney, Agent, or Firm—Rogers, Bereskin & Parr

[57] ABSTRACT

A fan for a forage harvesting system. The fan has paddles each having a propelling surface enlarged radially and in a front-to-rear direction for propelling air and forage. Spaced triangular shredder blades are mounted not only across the outer end of each paddle, but also aligned along the leading edge of each paddle. The leading edge shredder blades all slant towards the rear of their paddle and radially outwardly along their paddle and assist in chopping forage to varied lengths as forage passes over them.

6 Claims, 5 Drawing Figures

FAN FOR FORAGE HARVESTING SYSTEM

This invention relates to an improved forage harvester, and more particularly it relates to an improved fan for a forage harvester.

Forage harvesters are commonly used in bulk hay harvesting equipment, to pick up cut hay or the like from the field, and to shred the hay and blow it into a following stack former, where it is formed into a hay stack. Typical such macines are sold by McKee Bros. Ltd. of Elmira, Ontario, under their trade mark "STACK'N'MOVER". A typical such system is also shown in U.S. Pat. No. 3,883,010 issued May 13, 1975 naming Lorne Heslop as inventor.

One of the requirements of bulk hay systems of the kind in question is that they be capable of building a stack sufficiently dense so as not to be affected by the wind, and in which depressions will not form which will trap rain and melting snow. If puddles are trapped in depressions in the stack, the trapped water causes rotting of the stack, which is extremely undesirable. Various attempts have been made to increase the stack density, but because of the movement to which the stack is subjected during its handling, and because of the adverse weather conditions which it must withstand, it is found that still further increases in density are desirable.

The present invention provides an inexpensive and simple mechanism for increasing stack density. According to the invention, uniquely positioned shredder blades are provided on the harvester fan. The shredder blades of the invention are positioned so as to increase the variability of the lengths to which the harvested hay or other forage is cut. It is found that the improved random shredding action provided by the shredder blades of the invention chops the hay or other forage into a variety of different lengths, typically ranging between 2 and 12 inches. It is found that the forage, when shredded in this manner, knits well into a dense stack. This contrasts with forage which is chopped to uniform lengths; it is entremely difficult to build a long lasting stack of such forage.

In addition, it is thought that the improved random shredding action of the invention provides hay or forage which may be more palletable to animals than the uniformly chopped short material which has commonly been used in the past.

Further objects and advantages of the invention will appear from the following description, taken together with the accompanying drawings, in which.

Figure 1:
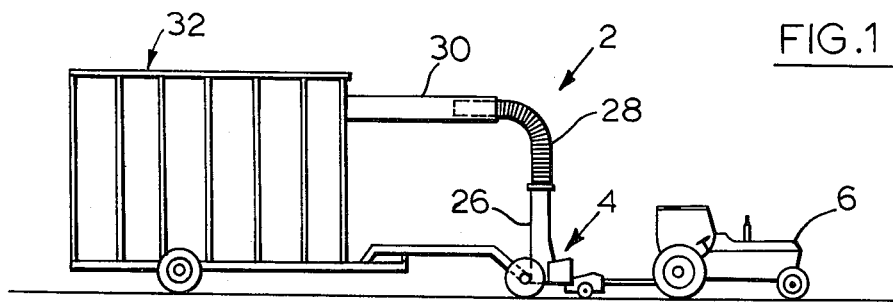
FIG. 1 is a side view showing a typical prior art bulk hay handling system.
Figure 2:
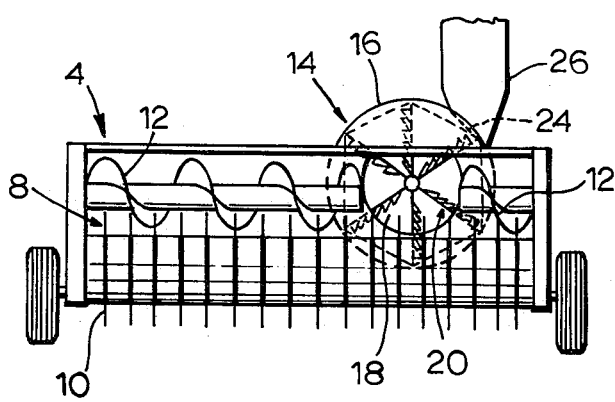
FIG. 2 is a front view of a harvester of the kind shown in FIG. 1 but incorporating the improved shredder fan of the invention.

Reference is first made to FIG. 1, which shows a typical prior art bulk hay handling system 2. The system 2 includes a harvester 4, which is towed by a tractor 6. The harvester 4 is powered by a power take off shaft (not shown) extending from the tractor. The harvester 4 includes a conventional pick up mechanism generally indicated at 8 (FIG. 2) and which includes rotating fingers 10 which pick up the forage lying in the field and deliver it to augers 12. The augers 12 deliver the forage to the front end of a fan 14 having a housing 16, a front opening 18, and rotating paddles 20.

The fan 14, which rotates in the direction of arrow 22, creates a moving air stream which sucks the forage into the fan, blows it out a side opening 24 and up duct 26, through a flexible pipe 28 (FIG. 1), through a discharge pipe 30, and into a stack former generally indicated at 32. Conventional means (not shown) are provided to reciprocate the discharge pipe 30 to obtain a desired distribution of forage in the stack former 32. Means may also be provided to compress the forage in the stack former 32. After the stack has been fully formed, it may be transported to a desired location and discharged by means of discharge chains (not shown) located on the floor of the stack former 32.

Figure 3:
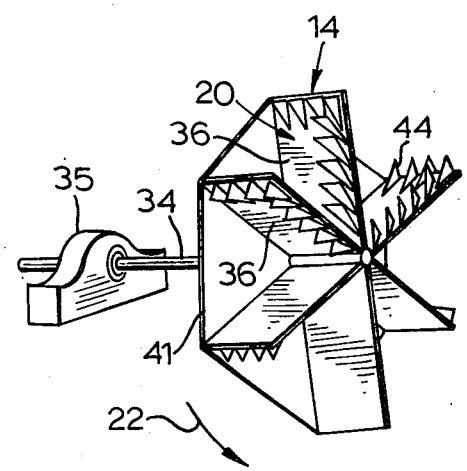
FIG. 3 is a perspective view of a portion of the shredder fan of the invention.
Figure 4:
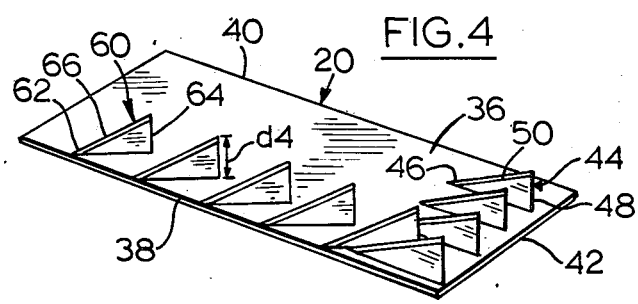
FIG. 4 is a perspective view of one of the paddles of the fan of FIG. 3.

As best shown in FIG. 3, the paddles 20 are mounted on a rotatable axle 34, which is mounted in a bearing diagrammatically indicated at 35 and propelled by a belt and pulley (not shown) connected to its rear end. The paddles 20 are mounted at equally spaced intervals around the axle 34 and each has a flat propelling surface 36 which propels air and forage. The propelling surfaces 36 extend radially from the fan axle 34 and also extend in a front to rear direction, thereby having a front edge 38 (FIGS. 4,5), a rear edge 40, and a radially outer edge 42. The rear edges 40 of the fan paddles are all joined by a backing plate 44, so that forage cannot pass rearwardly of the rear edges 40 but instead is discharged upwardly through the outlet duct 26.

The propelling surface of each paddle has, adjacent its outer end 42, four shredder blades 44. The shredder blades 44 are conventional and each is generally triangular in shape, having a radially inner low end 46, a radially outer raised end 48, and a sharpened upper edge 50. The shredder blades 44 are all parallel with each other, being oriented radially and spaced in a front to rear direction across the outer end of each propelling surface 36. The function of the blades 44 is to impart some shredding to the hay or other forage as it is propelled by the paddles 20.

According to the invention, further shredder blades 60 are provided on the propelling surface 26 of each paddle 20. The further shredder blades 60 are identical with the original shredder blades 44, each having a low front end 62, a raised rear end 64, and a sharpened upper edge 66. However, the front ends 62 of the further shredder blades 60 are all aligned along the front edge 38 of their associated paddle, and the further shredder blades 60 extend both rearwardly toward the rear edge 40 of their associated paddle, and radially outwardly.

It is found that hay or other forage entering the fan 14 slides over the further shredder blades 60 and is cut to random lengths thereby. The radially outward slant of the further shredder blades 60 ensures that the hay or other forage will slide past them and will not build up on the paddles. The spacing between the further shredder blades 60 permits some material to pass between them while other material is cut, thus improving the random shredding action.

Figure 5:
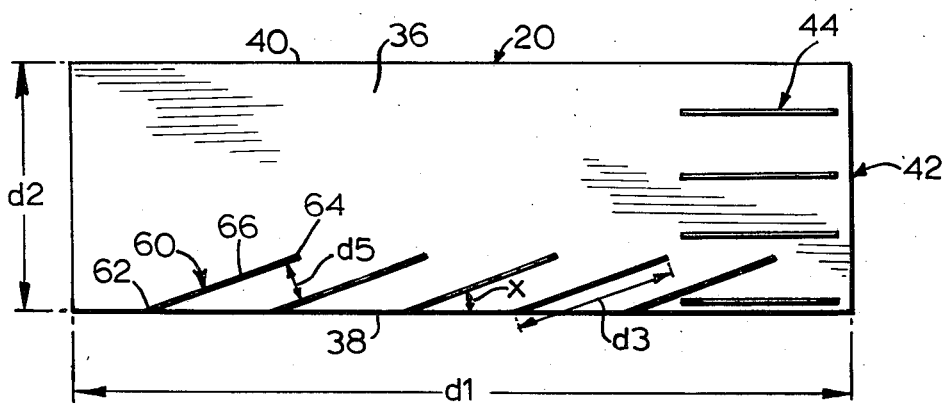
FIG. 5 is a top view of the paddle of FIG. 4.

In the preferred embodiment of the invention, the further shredder blades 60 are at least 0.85 inches apart measured in a direction normal to the blades (as indicated by dimension $d5$ in FIG. 5). Preferably the spacing between the further shredder blades 60, measured in a direction normal to the blades, is not less than 0.75 inches. If the spacing is too narrow, material will pass over the tops of the blades and the random shredding action will be less effective. The spacing should not be too wide, since at least two or three further shredder blades are desirably spaced along the length of each paddle 20.

In addition, preferably the angle X (FIG. 5) between each further shredder blade 60 and the front edge 38 of each propelling surface 36 is about 20°. If the angle is too small, then the space between the blades will be too narrow and again the random shredding action becomes less effective. If the angle is too great, material will be caught by the further shredder blades 60 and will tend to build up on the fan paddles. A preferred range for angle X is between 15° an 30°.

Preferably the front ends 62 of the further shredder blades 60 are all aligned along the front edge 38 of the paddle propelling surface 36. It will be appreciated, however, that the front ends 62 of the blades 60 need not be fully aligned and some or all of them can be spaced slightly rearwardly of the front edge 38 of the paddle propelling surface if desired.

In addition to improving the density and weather resistance of stacks made with the use of the invention, it is thought that the use of the invention also improves the palletability of the material in the stacks. It is generally thought that hay can be most efficiently fed to cattle if it is chopped short. When cattle pick up mouthfuls of hay which is chopped short to uniform lengths, very little hay will project outside the animals' mouths to fall to the ground. However, hay which is uniformly chopped to short lengths tends to contain aligned sharp ends which irritate the animals' mouths and stomachs. With the use of the invention, the hay is chopped to relatively short lengths (2 to 12 inches) typically), thus maintaining reasonable efficiency in feeding, but the likelihood of numerous chopped ends being aligned to irritate the animals' mouths and stomachs is greatly reduced.

In a prototype machine built according to the invention and which functioned extremely well in building dense, weather resistant stacks, a fan having 48 inch long paddles was used, rotating at about 1000 revolutions per minute. The relevant dimensions were as follows:

|   | dimension (inches) |
|---|---|
| d1 (length of paddle) | 21 |
| d2 (width of paddle) | 6 1/2 |
| d3 (length of shredder blades 44, 60) | 4 |
| d4 (height of rear of shredder blades 44,60) | 1 15/16 |
| d5 (average spacing between shredder blades 60 in direction normal to blades) | 7/8 |
| X (angle between blades 60 and leading edge 38) | 20 degrees |

What I claim as my invention is:

1. In a fan for blowing forage, said fan having a closed back, a front opening for receiving said forage and a side opening for discharging said forage, said fan comprising:
   a. a rotatable axle extending in a front to rear direction,
   b. a plurality of paddles mounted on said axle and projecting radially therefrom, each paddle having a propelling surface extending radially and in a front to rear direction for propelling air and forage through said side opening, each propelling surface having a front edge, an opposite rear edge, and a radially outer edge,
   c. a plurality of shredder blades located on each propelling surface adjacent said outer edge, each said shredder blade having a radially innermost lower end, a radially outermost trailing raised end, and a sharpened upper edge, the improvement comprising:
   d. a plurality of further shredder blades located on each propelling surface, each further shredder blade having a lower front end, a trailing raised end, and a sharpened upper edge,
   e. said front ends of said further shredder blades on each paddle being spaced apart in a radial direction on the said propelling surface of their associated paddle and such front ends being located adjacent said front edge of said propelling surface of their associated paddle, each further shredder blade extending in a direction both towards said back edge and radially outwardly along its associated paddle, so that forage entering said front opening of said fan will slide over said further shredder blades and will be cut thereby and so that said further shredder blades and said shredder blades in combination will cut said forage to varied lengths.

2. A fan according to claim 1 wherein the shortest distance between adjacent ones of said further shredder blades is at least 0.75 inches, and the angle between each said further shredder blade and said front edge of the propelling surface of its associated paddle is between 15° and 30°.

3. A fan according to claim 2 wherein said further shredder blades are triangular in shape, increasing in height from said front end to said rear end thereof.

4. The invention according to claim 3 wherein the front ends of the further shredder blades of each paddle are all aligned along the front edge of the propelling surface of their associated paddle, said further shredder blades of each paddle all being parallel to each other.

5. In a forage harvesting system comprising a harvester having a pick up mechanism for picking up forage lying on a field, a fan having a closed back, a front opening for receiving said forage from said pick-up mechanism and for blowing said forage, said fan having a side opening for discharging said forage, duct means for receiving said forage from said side opening of said fan and for directing said blown forage, and a stack former for receiving said blown forage from said duct for forming a stack therefrom, said fan comprising:
   a. a rotatable axle extending in a front to rear direction,
   b. a plurality of paddles mounted on said axle and projecting radially therefrom, each paddle having a propelling surface extending radially and in a front to rear direction for propelling air and forage, each propelling surface having a front edge, an opposite rear edge, and a radially outer edge,
   c. a plurality of shredder blades located on each propelling surface adjacent said outer edge, each said shredder blade having a radially innermost lower end, a radially outermost trailing raised end, and a sharpened upper edge, the improvement comprising:
   d. a plurality of parallel further shredder blades located on each propelling surface, each parallel further shredder blade having a lower front end, a trailing raised end, and a sharpened upper edge, e. said front ends of said further shredder blades on each paddle being spaced apart in a radial direction on the said propelling surface of their associated paddle and such front ends being located adjacent said front edge of said propelling surface of their associated paddle, each further shredder blade extending in a direction both towards said back edge and radially outwardly along its associated paddle, so that forage entering said front opening of said fan will slide over said further shredder blades and will be cut thereby and so that said further shredder blades and said shredder blades in combination will cut said forage to varied lengths, f. the front ends of said further shredder blades all being aligned along the front edge of the propelling surface of their associated paddle.

6. A forage harvesting system according to claim 5 wherein the shortest distance between adjacent ones of said further shredder blades is at least 0.75 inches, and the angle between each said further shredder blade and said front edge of the propelling surface of its associated paddle is between 15° and 30°.

* * * * *